US012783927B2

(12) United States Patent
Utsugi et al.

(10) Patent No.: US 12,783,927 B2
(45) Date of Patent: Nov. 3, 2026

(54) QUANTUM COMPUTER AND CONTROL METHOD THEREFOR

(71) Applicant: Hitachi, Ltd., Tokyo (JP)

(72) Inventors: Takeru Utsugi, Tokyo (JP); Noriyuki Lee, Tokyo (JP); Ryuta Tsuchiya, Tokyo (JP); Digh Hisamoto, Tokyo (JP); Toshiyuki Mine, Tokyo (JP)

(73) Assignee: HITACHI, LTD., Tokyo (JP)

( * ) Notice: Subject to any disclaimer, the term of this patent is extended or adjusted under 35 U.S.C. 154(b) by 920 days.

(21) Appl. No.: 18/115,388

(22) Filed: Feb. 28, 2023

(65) Prior Publication Data

US 2023/0409949 A1 Dec. 21, 2023

(30) Foreign Application Priority Data

Jun. 17, 2022 (JP) ................................. 2022-098352

(51) Int. Cl.
*G06N 10/40* (2022.01)

(52) U.S. Cl.
CPC .................................... *G06N 10/40* (2022.01)

(58) Field of Classification Search
None
See application file for complete search history.

(56) References Cited

U.S. PATENT DOCUMENTS 5,989,947 A * 11/1999 Dilger .................... H10D 30/00
977/773
6,661,022 B2 * 12/2003 Morie .................. H10D 30/688
257/E29.301
10,192,976 B2 * 1/2019 Petta ..................... H10F 77/146
11,990,516 B1 * 5/2024 George ................ H10D 62/812
12,342,733 B1 * 6/2025 Lampert ................ H10N 69/00
2002/0179897 A1 * 12/2002 Eriksson ............ H10D 48/3835
257/14
2020/0105994 A1 * 4/2020 Leipold .............. H10D 48/3835
2021/0326738 A1 * 10/2021 Kanno .................... G06F 17/18
2022/0149823 A1 * 5/2022 Redmond ............. G06N 3/045
(Continued)

FOREIGN PATENT DOCUMENTS

JP 2017005040 A * 1/2017
JP 2021-170198 A 10/2021
(Continued)

OTHER PUBLICATIONS

W.G. van der Wiel et al., "Electron transport through double quantum dots," Reviews of Modern Physics, vol. 75, Jan. 2003, pp. 1-22. (Year: 2003).*
(Continued)

*Primary Examiner* — Leigh M Garbowski
(74) *Attorney, Agent, or Firm* — MATTINGLY & MALUR, PC

(57) ABSTRACT

One preferred aspect of the invention is a quantum computer of a semiconductor, including: a semiconductor crystalline substrate; a gate electrode array structure formed on a surface of the semiconductor crystalline substrate; and a reservoir unit that is a carrier supply unit, in which a classic potential barrier is formed in the semiconductor crystalline substrate by controlling an applied voltage to the gate electrode array structure, and a charge supplied from the reservoir unit is transported into the classic potential barrier.

13 Claims, 21 Drawing Sheets

(56) References Cited

U.S. PATENT DOCUMENTS

| | | | | |
|---|---|---|---|---|
| 2022/0292383 | A1* | 9/2022 | Lee | G06N 10/40 |
| 2022/0327072 | A1* | 10/2022 | Künne | H10N 60/11 |
| 2022/0335322 | A1* | 10/2022 | Künne | G06F 13/20 |
| 2022/0351063 | A1* | 11/2022 | Van Diepen | G01R 27/02 |
| 2023/0194600 | A1* | 6/2023 | Mortemousque | G01R 31/31702<br>702/186 |
| 2023/0196166 | A1* | 6/2023 | Mohiyaddin | G06N 10/40 |
| 2023/0200261 | A1* | 6/2023 | Lizuka | H10D 48/385<br>257/39 |
| 2023/0231016 | A1* | 7/2023 | Tanamoto | H10D 62/814<br>257/13 |
| 2023/0297873 | A1* | 9/2023 | Shinkai | G06N 10/20<br>708/190 |
| 2023/0389346 | A1* | 11/2023 | Li | H10D 62/126 |
| 2024/0290872 | A1* | 8/2024 | Leon | G06N 10/40 |
| 2025/0131316 | A1* | 4/2025 | Künne | G06N 10/70 |

FOREIGN PATENT DOCUMENTS

| | | | |
|---|---|---|---|
| WO | 01/84634 | A1 | 11/2001 |
| WO | 2017/190030 | A1 | 11/2017 |

OTHER PUBLICATIONS

J.M. Elzerman et al., "Single-shot read-out of an individual electron spin in a quantum dot," Nature, vol. 430, Jul. 22, 2004, pp. 431-435. (Year: 2004).*

Japanese Office Action received in corresponding Japanese Application No. 2022-098352 dated Oct. 7, 2025.

Giblin et al., "Evidence for universality of tunable-barrier electron pumps", Metrologia 56.4, 2019.

* cited by examiner

QUANTUM COMPUTER AND CONTROL METHOD THEREFOR

CROSS-REFERENCE TO RELATED APPLICATION

The present application claims priority from Japanese application JP2022-098352, filed on Jun. 17, 2022, the contents of which is hereby incorporated by reference into this application.

BACKGROUND OF THE INVENTION

1. Field of the Invention

The present invention relates to a device integrating quantum bits and a control method for the device.

2. Description of the Related Art

A quantum computer is considered to be capable of performing high-speed information processing compared to the existing computer. The existing computer handles binary values of 0 and 1, whereas the quantum computer handles a superposition state of the binary values.

In order to handle the superposition state, the quantum computer requires an element attaining a quantum bit. The quantum bit can be attained by using such as a quantum dot of a superconductive element, a cold atom, a photon, and a semiconductor element. It is known that a basic manipulation of the quantum computer includes initialization, an operation, and readout, and there are a single-quantum bit gate, a two-quantum bit gate, and the like as a basic operation, and thus, a universal quantum calculation can be attained by a combination thereof.

Here, an initialization method in a quantum bit using a semiconductor element will be described. By applying a voltage to a gate electrode formed in a semiconductor device, a fine potential structure that is capable of confining electrons one by one is generated in the semiconductor, the electrons are transported to the potential and confined one by one, and the spins thereof (the degree of freedom used as the quantum bit) are aligned, and thus, the quantum bit is initialized. Here, the manipulation of "transport" and "confinement" of the electron will be collectively referred to as "loading". A method for loading electrons one by one to a quantum dot has been studied.

In WO 2001/84634 A1, a method for moving an electron using a coulomb blockade phenomenon is disclosed. In addition, in WO 2017/190030 A1, a method for moving a single electron between quantum dots by a tunneling effect is disclosed. In Giblin, Stephen P., et al. "Evidence for universality of tunable-barrier electron pumps." Metrologia 56.4 (2019): 044004, the principle of a single-electron pump described below is reported.

SUMMARY OF THE INVENTION

The invention relates to a method for moving (loading) electrons one by one to each dot of a quantum dot array at a high speed and a high accuracy, in order to attain a quantum computer having a quantum dot array structure.

In both of WO 2001/84634 A1 and WO 2017/190030 A1, the single electron is moved by the tunneling effect. This is because the picture of the coulomb blockade using the tunneling effect in order to move the single electron, or a single-electron transistor using the coulomb blockade has been widely used.

However, the movement of the electron using the tunneling effect is the control of a quantum phenomenon, and is susceptible to noise, has difficulty in a voltage control accuracy, a device manufacturing accuracy, and the like, and has a problem in scalability when performing large-scale integration. In particular, since the tunneling effect is intrinsically a probabilistic phenomenon, it is known that there are many problems in a high speed, a high accuracy, and stability.

On the other hand, in a quantum computer of a large-scale quantum dot array, it is necessary to load an electron at a high speed and a high accuracy, and for example, a transport rate in the order of GHz and an error rate in the order of ppm are desirable. In addition, it is necessary to confine the electron at high stability. Accordingly, the method for loading the electron on the basis of the tunneling effect and the coulomb blockade of the related art has problems in the speed, the accuracy, and the stability.

Therefore, an object of the invention is to provide a loading method with improved stability, in particular, in a quantum computer.

One preferred aspect of the invention is a quantum computer of a semiconductor, including: a semiconductor crystalline substrate; a gate electrode array structure formed on a surface of the semiconductor crystalline substrate; and a reservoir unit that is a carrier supply unit, in which a classic potential barrier is formed in the semiconductor crystalline substrate by controlling an applied voltage to the gate electrode array structure, and a charge supplied from the reservoir unit is transported into the classic potential barrier.

Another preferred aspect of the invention is a control method for a quantum computer including a semiconductor, executing: a first step of ejecting a unit charge by using a classic potential barrier from a reservoir unit that is a carrier supply unit; a second step of sending the ejected unit charge to a desired quantum bit position by using a gradient of the classic potential barrier; and a third step of performing a quantum bit operation with respect to the unit charge sent to the desired quantum bit position.

It is possible to provide the loading method with the improved stability, in particular, in the quantum computer.

DETAILED DESCRIPTION OF THE PREFERRED EMBODIMENTS

Figure 1:
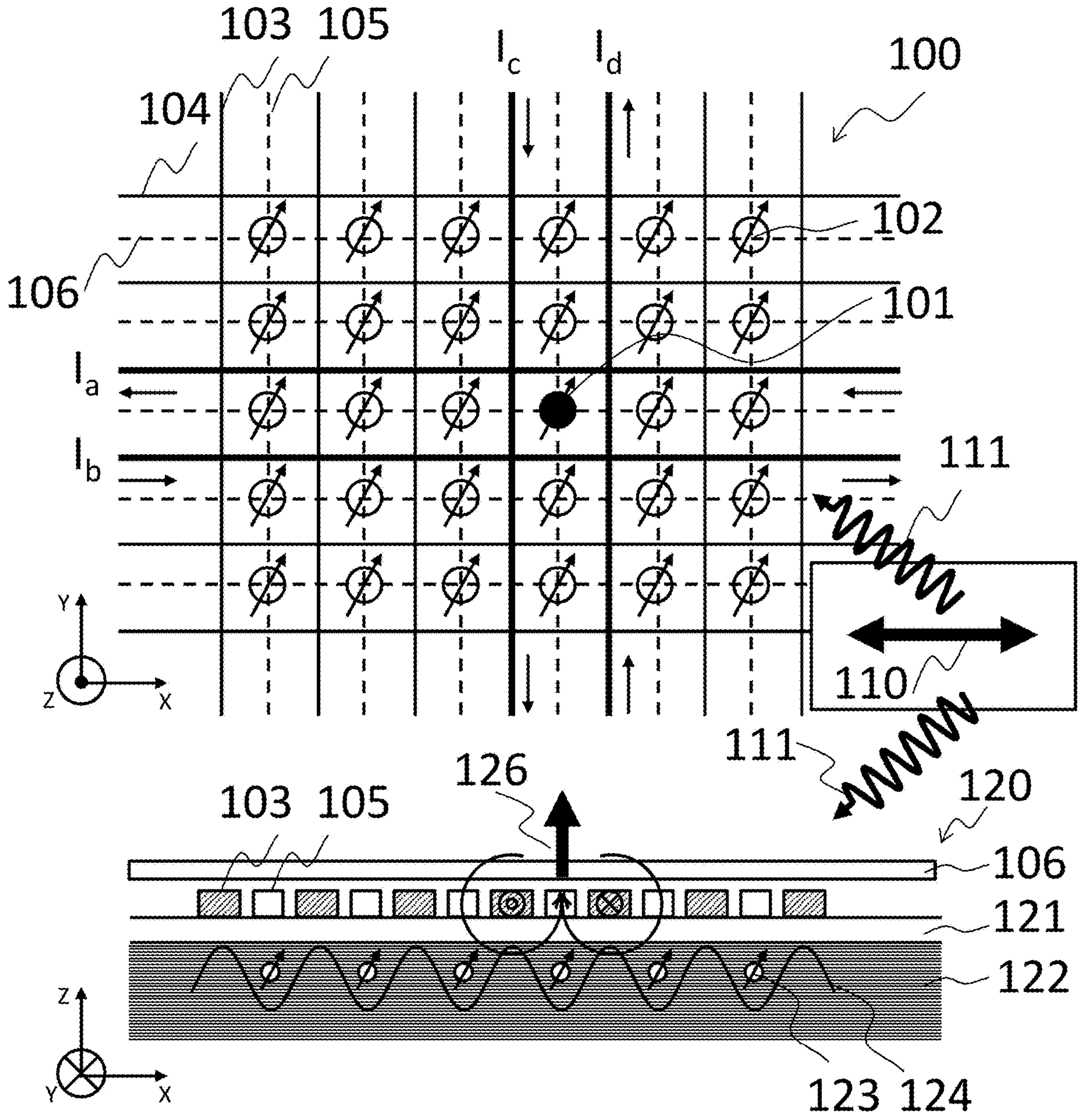
FIG. 1 is a two-sided view illustrating an outline of a two-dimensional quantum bit array.

Hereinafter, embodiments will be described in detail by using the drawings. Here, the invention is not to be construed as being limited to the following description of the embodiments. It is easily understood by a person skilled in the art that a specific configuration of the invention can be changed within a range not departing from the idea or gist of the invention.

In the following configuration of the invention, the same reference numeral may be used in common for the same constituent or a constituent having a similar function in different drawings, and the repeated description may be omitted. In a case where there are a plurality of constituents having the same or similar function, the constituents may be described by applying different suffixes. Here, the suffix may be omitted.

In the present specification or the like, the notation such as "first", "second", and "third" is to identify the constituents, and does not necessarily limit the number, the order, or the contents. In addition, a reference numeral for identifying a constituent is used for each context, and the reference numeral used in one context does not necessarily indicate the same constituent in another context. In addition, a constituent identified by a certain reference numeral may have the function of a constituent identified by another reference numeral.

In order to facilitate understanding of the invention, the position, size, shape, range, and the like of each configuration illustrated in the drawings and the like may not represent the actual position, size, shape, range, and the like. Accordingly, the invention is not necessarily limited to the position, size, shape, range, and the like illustrated in the drawings and the like.

Example 1

[Basic Configuration]

A quantum computer will be described in which a semiconductor element is used and an electron spin is set as a quantum bit. Such a quantum computer includes a plurality of two-dimensional quantum bit arrays. The quantum bit is a spin quantum bit in which the spin of an electron (or a hole, hereinafter, the electron will be assumed, but the hole may be assumed) in the semiconductor is set as the degree of freedom. Note that, there is JP 2021-27142 A in which the two-dimensional quantum bit array is proposed.

FIG. 1 is a two-sided view illustrating the outline of the two-dimensional quantum bit array. In this drawing, a part of a quantum bit array 100 including a plurality of quantum bits is illustrated. The quantum bit array 100 is mounted in a chip placed at an ultralow temperature of several mK to several K, and is operated in a region where a thermal fluctuation is negligible. Hereinafter, the description will be made by assuming that the thermal fluctuation or excitation is negligible.

A quantum bit 101 is a selective quantum bit to be controlled, and other quantum bits (for example, 102) are a non-selective quantum bit. Each of wiring 103 and wiring 104 is a composite structure of wiring and a gate electrode arranged between each of quantum bits in a Y direction and an X direction, and is used to generate a local magnetic field 126 in the quantum bit by allowing currents Ia, Ib, Ic, and Id to flow.

In addition, the wiring 103 and the wiring 104 are also capable of being used as a gate electrode for controlling coupling strength between the electron spins, and are also capable of functioning as a two-quantum bit gate by an exchange interaction. Further, each of wiring 105 and wiring 106 is a composite structure of wiring and a gate electrode arranged directly above each of the quantum bits in the Y direction and the X direction, and can be used as a gate electrode for trapping the electron to be the quantum bit.

A sectional view 120 is a sectional view of the quantum bit array 100, for example, on a line in which there is the quantum bit, such as the wiring 106, and is a metal oxide insulator (MOS) structure including an insulating layer 121, a semiconductor layer 122, and a gate electrode layer that forms the wiring 103 or the wiring 105 to be a plurality of gate electrodes. By adjusting a voltage that is applied to the wiring 103 or the wiring 105 to be the gate electrode, a potential 124 is generated in the semiconductor layer 122, and an electron 123 or the like is trapped.

Further, in this element, a unit for generating an alternating-current magnetic field in a polarization direction 110 is provided, and for example, is mounted by a microstrip line or a coplanar waveguide. Accordingly, an approximately homogeneous alternating-current magnetic field 111 is applied to the entire quantum bits. By shifting a resonant frequency of one desired quantum bit with a local magnetic field 126 according to the application of the current, and by allowing an irradiated RF frequency of the alternating-current magnetic field 111 to be coincident with this shifted resonant frequency, an optional quantum bit is selected and a quantum gate manipulation is performed. As described above, the spin quantum bit can be manipulated by an electron spin resonance (ESR).

Note that, such drawings are a schematic view in which a part of the quantum bit array 100 is enlarged, and the actual gate dimension and the thickness of each layer do not indicate the actual dimension.

A two-dimensional integrate quantum bit array in which the electron spin described above is set as the quantum bit is based on the premise that the electrons are already arranged one by one in each site, and in actuality, it is necessary to transport and confine the electrons one by one to each of the quantum dots (sites). This will be referred to as electron loading. Hereinafter, the electron loading will be described.

[Outline of Electron Loading Method]

Figure 2A:
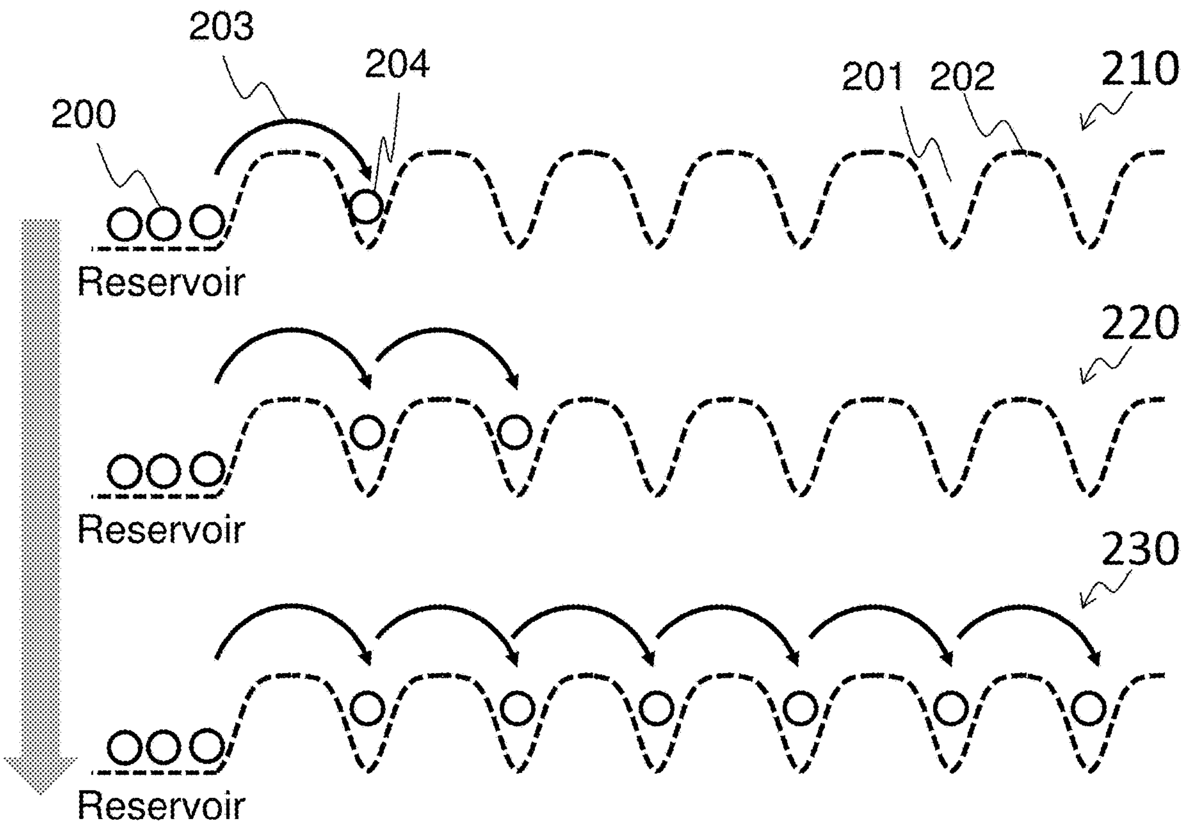
FIG. 2A is a potential diagram for illustrating electron loading.

FIG. 2A illustrates a potential diagram for illustrating the electron loading. A dotted line indicates a potential distribution of the electron. It is necessary to store the electrons one by one in a quantum dot 201 from a reservoir unit 200 including a plurality of electrons. The quantum dot 201 is a valley potential structure in which both sides are a potential barrier 202, and a manipulation 203 of moving electrons 204 one by one to the quantum dot will be described. The potential barrier 202, for example, can be controlled by a gate voltage of the wiring 103 in FIG. 1.

First, a "single-electron pump operation" of transporting only one electron from the reservoir unit 200 including the plurality of electrons over the potential barrier 202 is required. Next, a "transport operation" of transporting one electron stored in the quantum dot to the next quantum dot is required. By sequentially repeating such two operations, the electron can be confined to the quantum dot as 220 and 230.

Figure 2B:
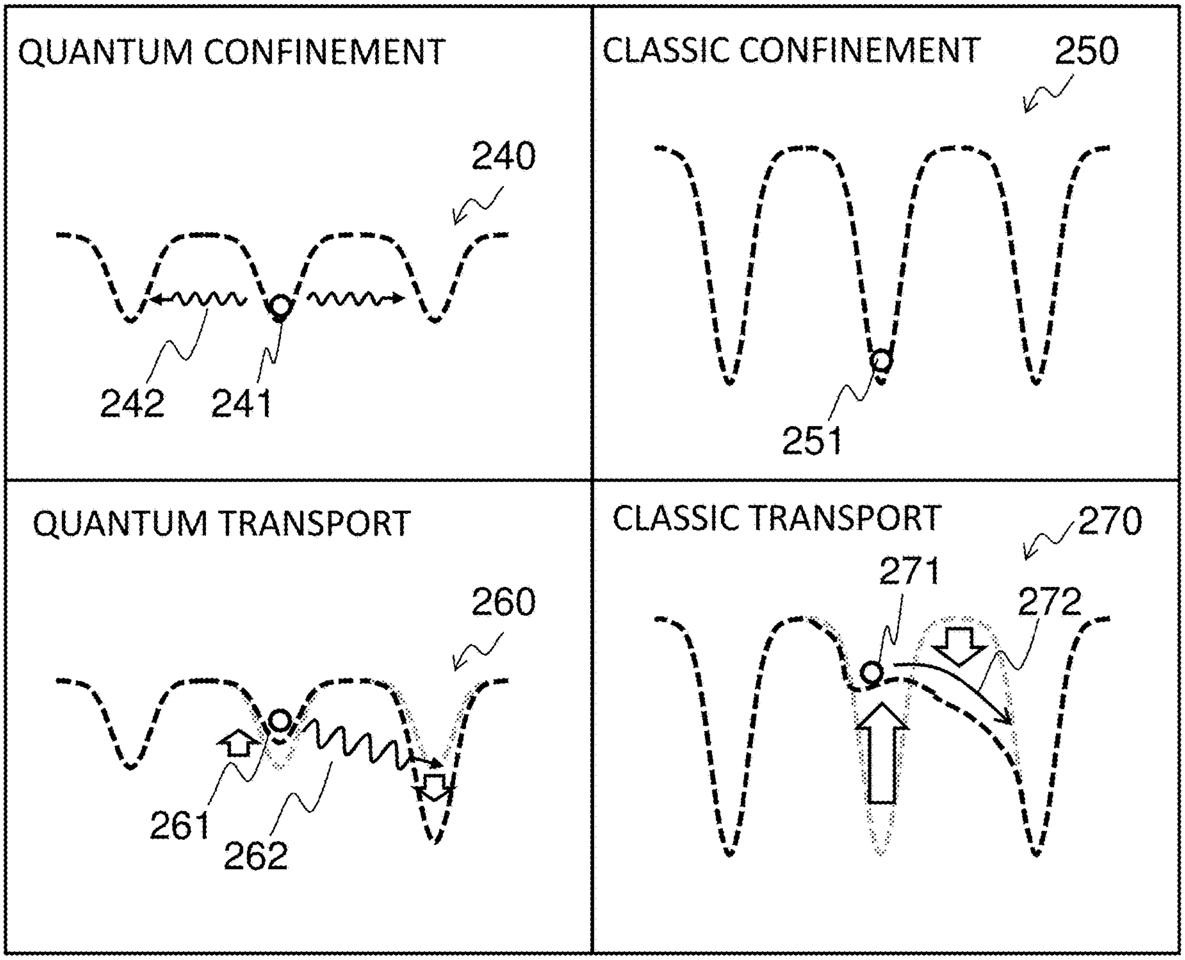
FIG. 2B is a schematic view of the type of electron confinement.

FIG. 2B illustrates a schematic view of the type of electron confinement. In this example, the electron confinement will be classified into two types of "quantum confinement" and "classic confinement". In the "quantum confinement", as 240 illustrated in a schematic diagram, an electron 241 can be moved to the next quantum dot by a tunneling effect 242, in a state where the potential barrier is comparatively low or thin.

On the other hand, in the "classic confinement", as 250 illustrated in a schematic diagram, an electron 251 is not capable of being moved to the next quantum dot by the tunneling effect (a tunneling probability is negligible), in a state where the potential barrier is comparatively high or thick, and is stably confined. A difference between the quantum confinement and the classic confinement, for example, is characterized by the energy of the potential barrier, and in the quantum confinement, a voltage range is set to 0.1 to 100 mV, for example, 0.1 to several 10 mV, whereas in the classic confinement, a voltage range is set to 0.1 to 10 V, for example, 0.1 to several V.

Similarly, the electron transport will be classified into two types of "quantum transport" and "classic transport". The "quantum transport" indicates the movement of the electron between the quantum dots due to the tunneling effect, and the "classic transport" indicates the movement of the electron at the bottom of the potential.

In the "quantum transport", as 260 illustrated in a schematic diagram, for example, the potential barrier indicated by the dotted line is modulated as illustrated by an arrow, and thus, an electron 261 is moved to the next quantum dot by a tunneling effect 262.

In the "classic transport", as 270 illustrated in a schematic diagram, for example, the potential barrier indicated by the dotted line is modulated as illustrated by an arrow, and thus, an electron 271 is moved to the next quantum dot by a manipulation 272 of climbing over the potential barrier.

[Operation of Pump Unit]

In order to load the electron to a large-scale quantum dot array at a high speed, a high accuracy, and high stability, it is necessary to perform the "classic confinement" described above with respect to the electron. However, in the case of performing the classic confinement, it is necessary to heighten the potential barrier as the tunneling effect is negligible.

Figure 3A:
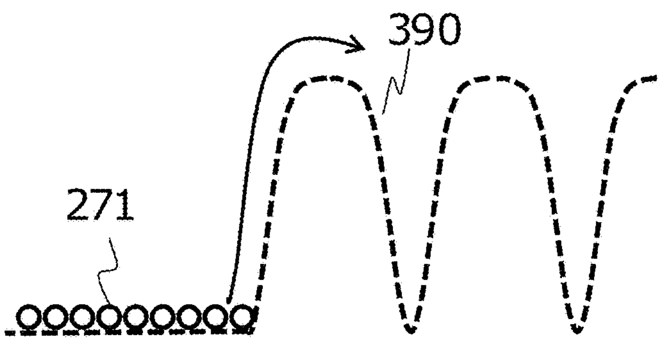
FIG. 3A is a schematic view of transporting an electron to a quantum dot by classic confinement.

FIG. 3A is a schematic view of the transport of the electron to the quantum dot by the classic confinement. In order to transport the electron to this quantum dot, as illustrated in FIG. 3A, it is necessary for the electron 271 to climb over a high potential barrier 390 by a method other than the tunneling effect.

Accordingly, a method referred to as a ratchet mode single-electron pump (hereinafter, referred to as a single-electron pump) is operated as the "classic transport" described above. The principle of the single-electron pump is disclosed in Giblin, Stephen P., et al. "Evidence for universality of tunable-barrier electron pumps." Metrologia 56.4 (2019): 044004. Accordingly, it is possible to transport the electron to the quantum dot by leaping over a high potential barrier for the "classic confinement", and it is possible to attain the classic confinement of the electron.

Figure 3B:
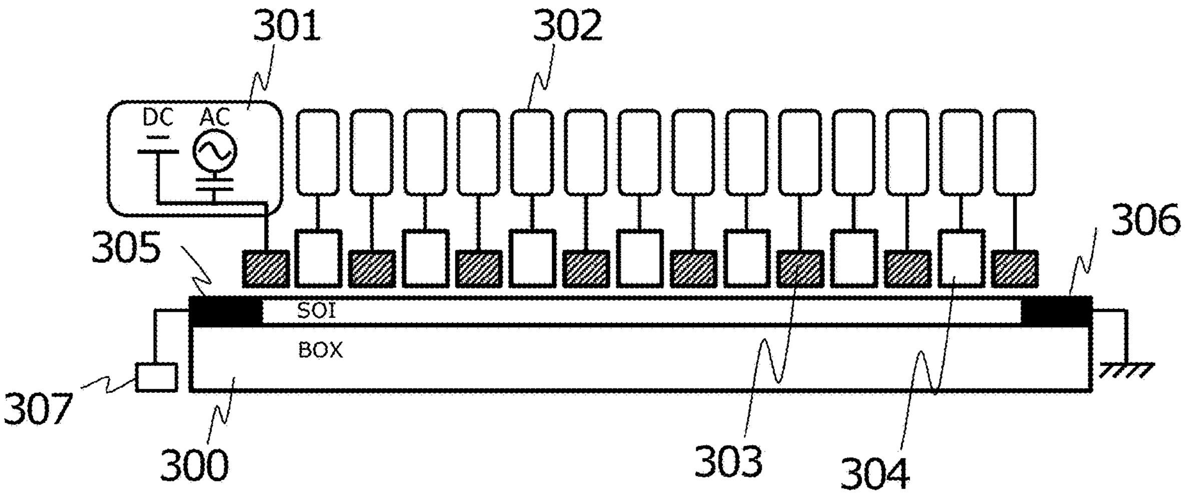
FIG. 3B is a schematic view illustrating an example of a configuration of attaining a single-electron pump.

FIG. 3B illustrates an example of a configuration of attaining the single-electron pump. It is configured that a reservoir 305 and a drain 306 are attached to the configuration of the sectional view of 120 in FIG. 1. The reservoir 305 includes a plurality of electrons. In addition, in this configuration example, a silicon on insulator (SOI) layer (corresponding to the insulating layer 121 and the semiconductor layer 122 in FIG. 1) and a buried oxide (BOX) layer are provided, and two types of gate electrodes 303 and 304 (corresponding to the wiring 103 and the wiring 105 in FIG. 1) are further provided.

In an example, a voltage between the reservoir 305 and the drain 306 is adjusted to 0 V, for example, by a voltage adjustment circuit 307. A circuit 301 that is capable of applying a DC bias and an AC voltage is connected to an electrode closest to the reservoir 305 among the gate electrodes 303. In addition, a circuit 302 that is capable of applying a DC voltage is also connected to another electrode. The circuit 302 may be capable of further applying an AC voltage. Note that, such circuits 301 and 302 may be either a digital circuit or an analog circuit, or a composite circuit thereof, and an output voltage may be either a digital discrete-valued voltage or an analog approximately continuous-valued voltage, or a composite thereof.

Figure 3C:
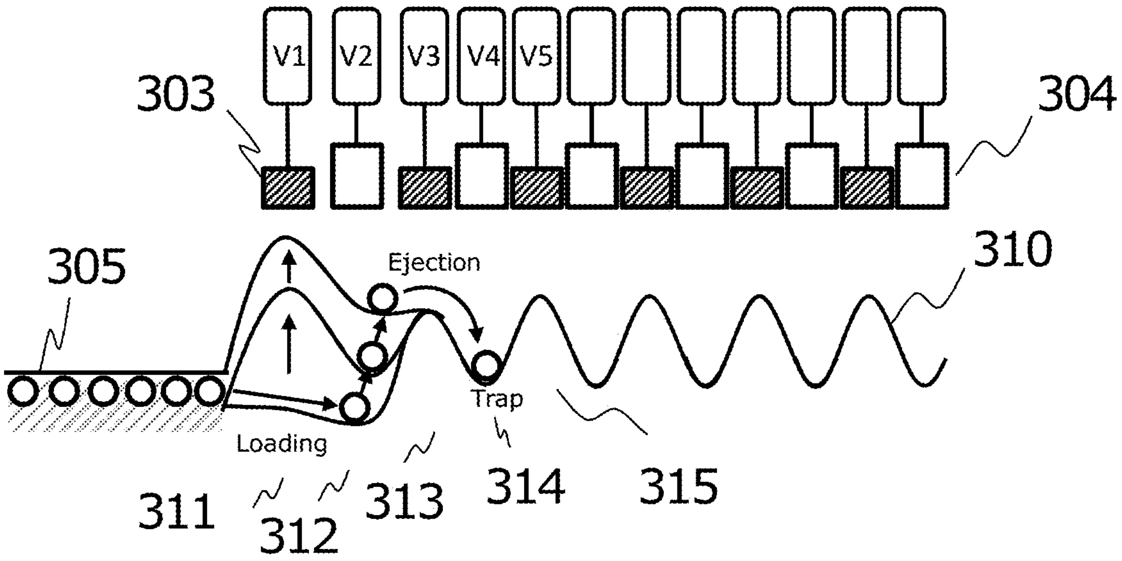
FIG. 3C is a schematic view for performing a single-electron pump operation.

FIG. 3C illustrates a schematic view for performing the single-electron pump operation, in the configuration of FIG. 3B. A potential 310 indicates the potential of the electron in the quantum dot that is formed in SOI and is subjected to the classic confinement. The single-electron pump is a technology of transporting only one electron from the reservoir 305. A set of potentials 311, 312, and 313 is the single-electron pump, and in this portion, a single electron is transported from the reservoir 305 to a potential 314 by one manipulation.

First, the gate electrode 303 is driven by the circuit 301, and a DC voltage and an AC voltage are applied to the potential barrier 311. The AC voltage, for example, is driven around a DC level at a frequency of 100 MHz, 1 GHz, 10 GHz, or the like. To the other potential 312 or the like, the DC voltage is applied, and the AC voltage is not applied. A magnitude relationship between the DC voltages of each of the gates will be described below.

Accordingly, the electron enters the potential 312 (loading), and climbs over the mountain of the potential barrier 313 (ejection), and only one electron is trapped in the potential 314 (a portion surrounded by the potential barriers 313 and 315) (trap). As described above, a charge supplied from the reservoir 305 is transported into a classic potential barrier. After the electron is trapped once in the potential 314, each quantum dot is transported.

In a case where an AC amplitude of the potential barrier 311 is large, the power of the electron pump for extracting the electron from the reservoir 305 strengthens, and in this example, it is necessary to extract a single electron, and thus, it is necessary to adjust the amplitude. A calibration method for the AC amplitude will be described later in FIG. 8B.

Figure 3D:
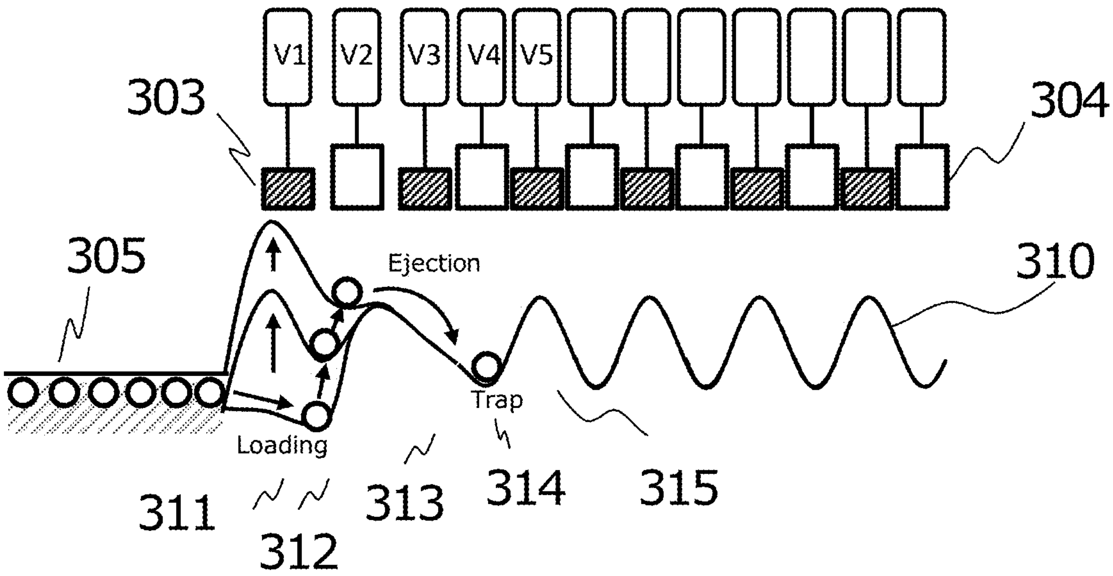
FIG. 3D is a schematic view for performing another single-electron pump operation.

FIG. 3D illustrates a configuration in which the height of the potential barriers 311, 312, and 313 is different from that in FIG. 3C. The height of the potential can be controlled by the gate voltage directly above. FIG. 3C and FIG. 3D are different only in DC setting, and AC is similarly applied to be superimposed on the potential barrier 311. Note that, for example, the AC voltage can be applied to not only the potential barrier 311 but also two gates of the potential barriers 311 and 312 simultaneously.

As illustrated in FIG. 3C and FIG. 3D, in a case where overdrive voltages obtained by subtracting a threshold voltage of each of the gates from a voltage value applied to each of the gates are each set to V1 to V5, for example, the single-electron pump illustrated in FIG. 3C can be attained by setting "DC Level of V1 and V3<DC Level of V2".

In addition, the single-electron pump illustrated in FIG. 3D can be attained by setting "DC Level of V1 and V3>DC Level V2". Here, as the voltage value of the DC level increases, the potential of the electron decreases. Note that, the actual potential shape may be more complicated in accordance with the influence of a spacer between the gate electrodes, or the like, and a single-electron pump condition can be satisfied by adjusting the gate voltage.

According to the configuration described above, it is possible to transport and confine the electrons one by one from the reservoir including the plurality of electrons to a classic confinement quantum dot by using the single-electron pump operation. This is operated in the region of the classic transport, and thus, the operation can be performed at a high speed, a high accuracy, and high stability, and for example, high-speed transport such as 1 GHz can also be attained, which is the basic technology of the quantum computer of the large-scale quantum dot array.

[Operation of Dot Portion (Loading Sequence)]

Next, a method for transporting one electron trapped by the single-electron pump to different quantum dots will be described. A loading sequence will also be referred to as shuttling.

Figure 4A:
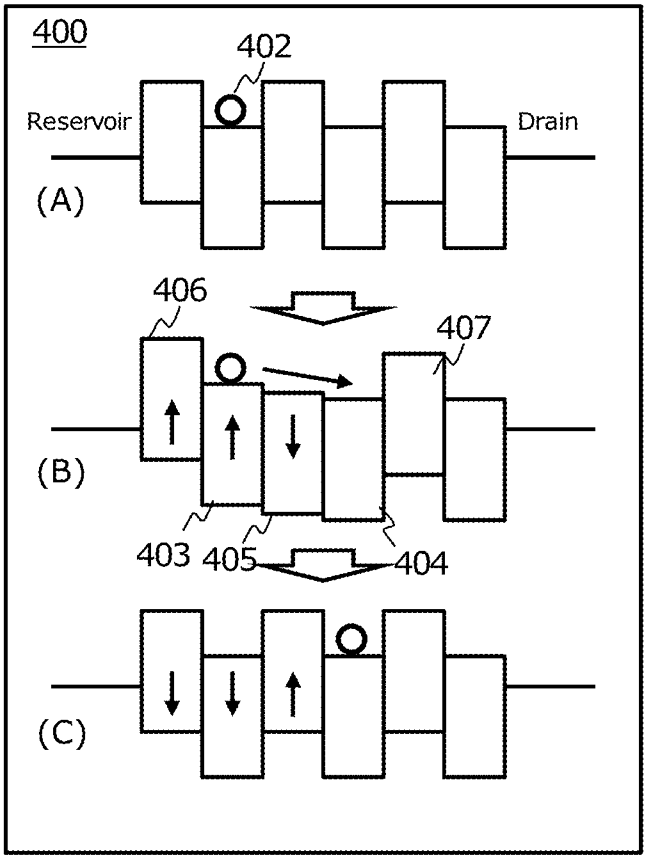
FIG. 4A is a schematic view of a single-electron transport method.
Figure 4B:
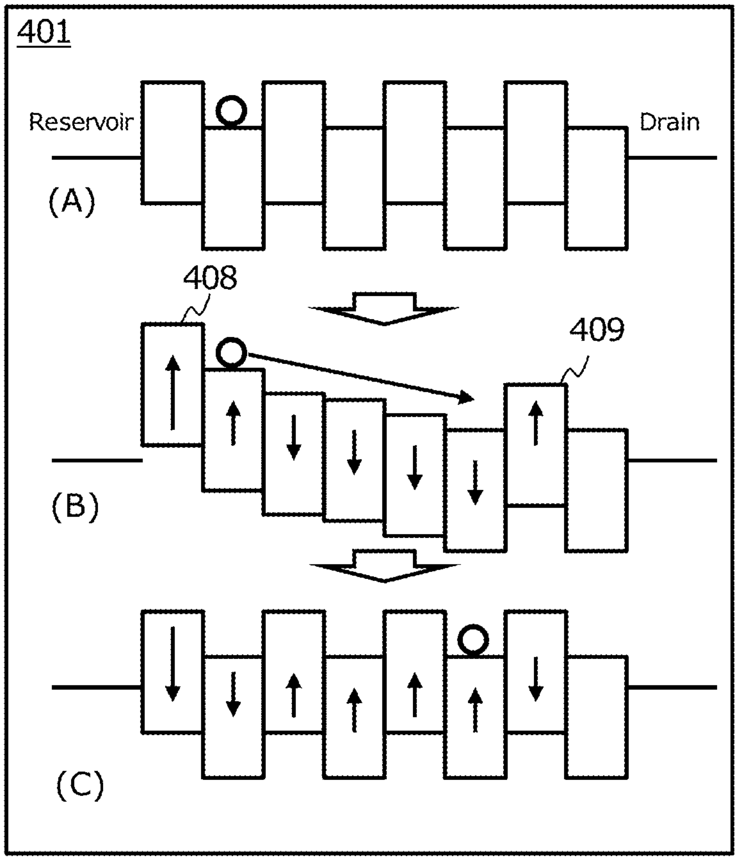
FIG. 4B is a schematic view of another single-electron transport method.

FIG. 4A and FIG. 4B illustrate a schematic view of a single-electron transport method. FIG. 4A and FIG. 4B illustrate a method for transporting the electron between the dots on the right side after the electron is trapped once in the potential 314 (set to an initial state (A)), as described in FIG. 3C and FIG. 3D. Here, each rectangular block indicates the potential in a simplified manner, and the height thereof can be controlled by the voltage value applied to the gate electrode directly above.

In FIG. 4A, a sequence 400 indicates a sequence of transporting an electron 402 from the left to the right from the initial state (A). In order to move the electron 402, a potential gradient is created from a potential 403 in which the electron is currently present to a potential 404 to which the electron is to be moved (B). For example, the potential 403 is heightened, and a potential 405 is lowered. A potential 406 is heightened (or is not lowered) such that the electron is not returned to the left. In addition, the potential 407 is heightened (or is not lowered) such that the electron is not excessively moved to the right.

As described above, according to the manipulation of the potential gradient, it is possible to transport the electron to the next quantum dot (C). This can also be attained by the classic transport described above. By repeating the sequence 400, it is possible to transport the electron to a desired quantum dot.

A sequence 401 in FIG. 4B is another electron transport method. A potential 408 of the quantum dot before transport on a side opposite to the quantum dot after transport is heightened, all the potentials on the side of the quantum dot after transport are lowered, and a potential 409 of the quantum dot after transport on a side opposite to the quantum dot before transport is heightened (B). Accordingly, it is possible to transport the electron to the desired quantum dot (C). Note that, in the electron transport methods in FIG. 4A and FIG. 4B, a voltage between the reservoir and the drain is set to 0 V.

Figure 5:
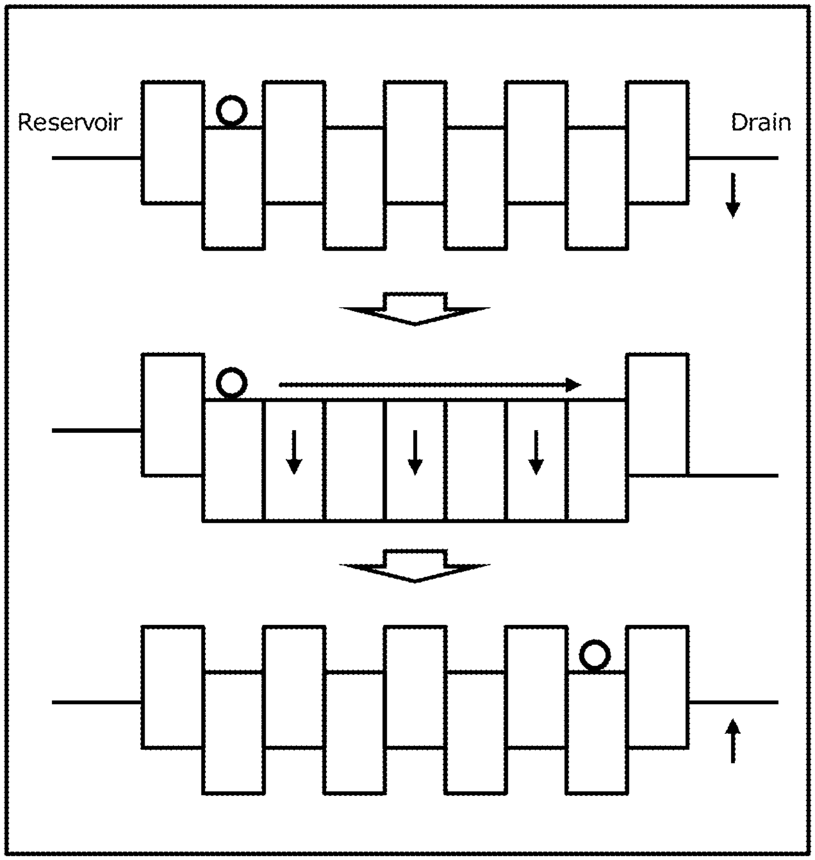
FIG. 5 is a schematic view of another single-electron transport method.

FIG. 5 illustrates another electron transport method. In this method, the voltage between the reservoir and the drain is changed from 0 V when transporting the electron. For example, a direction to which the electron is moved is set to a positive potential. Simultaneously, by decreasing the height of all the potential barriers between the quantum dot before transport and the quantum dot after transport, the electron can be extracted and transported to the desired quantum dot. After the electron is transported, the voltage between the reservoir and the drain is returned to 0 V.

Note that, in the single-electron pump, in order to eject one electron, a high voltage adjustment accuracy is required, and for example, an adjustment accuracy of 0.1 mV or less is required. On the other hand, in the electron transport, a comparatively low voltage adjustment accuracy is sufficient, and for example, an adjustment accuracy of approximately 1 V is sufficient.

[Two-Dimensional Configuration]

By combining the single-electron pump and the single-electron transport described above, it is possible to transport the electron to the desired quantum dot on the two-dimensional large-scale quantum dot array.

Figure 6A:
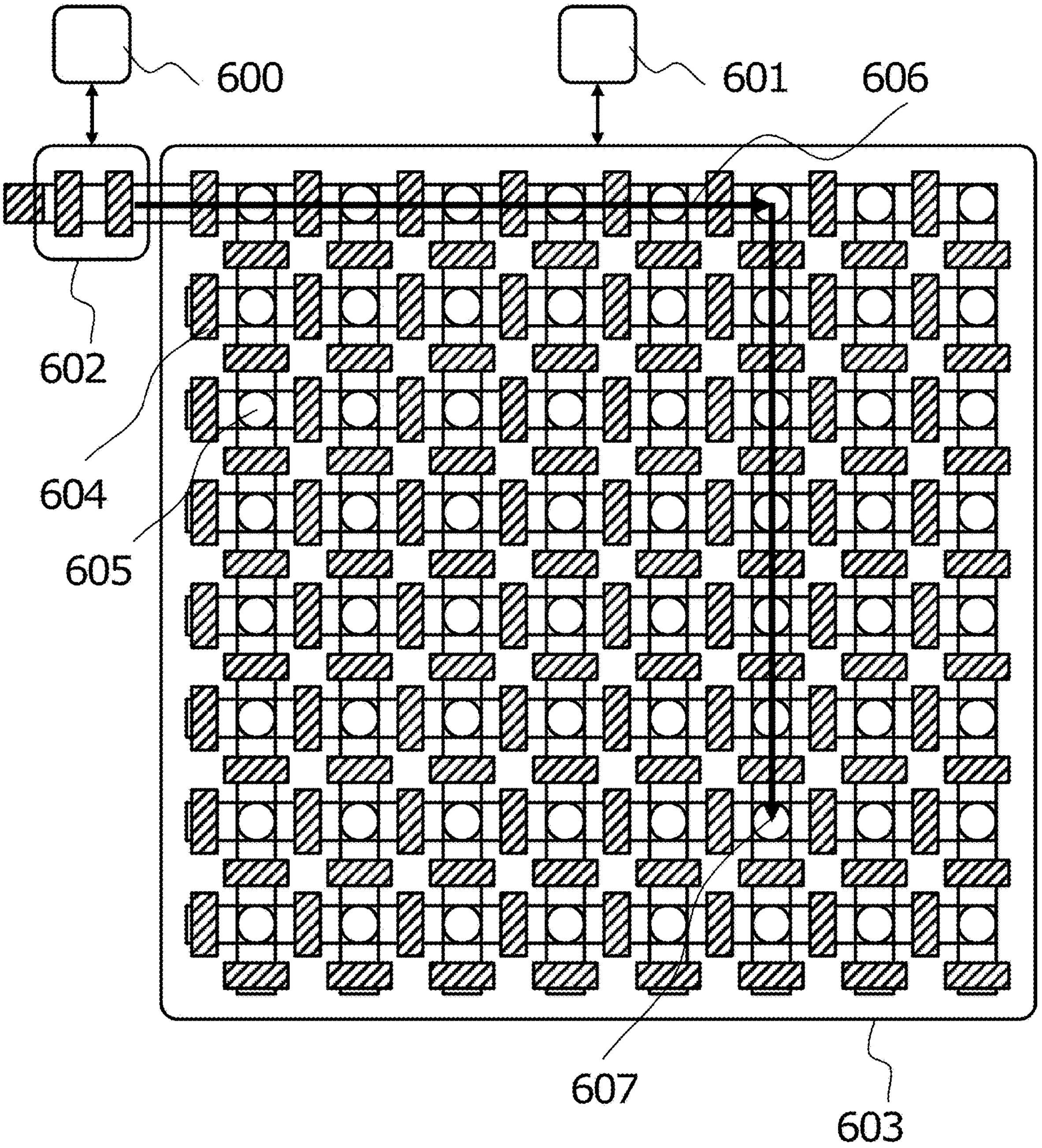
FIG. 6A is a plan view of a two-dimensional large-scale quantum dot array.

FIG. 6A illustrates an example. A single-electron pump control circuit 600 and a quantum dot control circuit 601 are provided, and a voltage that is applied to a gate electrode of each of a single-electron pump portion 602 and a quantum dot array portion 603 is controlled. In the single-electron pump portion 602, the manipulation illustrated in FIG. 3B to FIG. 3D is performed. In the quantum dot array portion 603, the manipulation illustrated in FIG. 4A to FIG. 5 is performed.

Here, there is a relationship of "Number of Single-Electron Pump Portions<Number of Quantum Dots in Quantum Dot Array", and thus, it is possible to efficiently load the electron by decreasing the number of pump portions with a high driving adjustment accuracy. In addition, in a case where the number of quantum dots in the quantum dot array is large, the influence of an element variation increases, but a control accuracy of the electron transport does not increase as described above, and thus, robustness can be improved by this relationship.

A potential barrier 604 and a quantum dot portion 605 that confines the electron are arranged two-dimensionally, and the electron is transported by the pump, and thus, the electron is loaded to each of the quantum dots (the gate electrode directly above the quantum dot is not illustrated for the visibility of the drawing). For example, in order to load the electron to a desired quantum dot 607, one electron may be ejected from the reservoir by the single-electron pump portion 602 (refer to FIG. 3B to FIG. 3D), and then, the electron may be transported along a route 606 (refer to FIG. 4A to FIG. 5). In this case, all the potential barriers outside the route are heightened such that the electron is not ejected outside the route 606.

In addition, a driving frequency of the single-electron pump portion 602 and an electron transport frequency between the quantum dots of the quantum dot control circuit 601 are synchronized as a relationship in integral multiple or rational multiple, and thus, the simplification of the control circuit and a high accuracy of the transport can be attained.

Figure 6B:
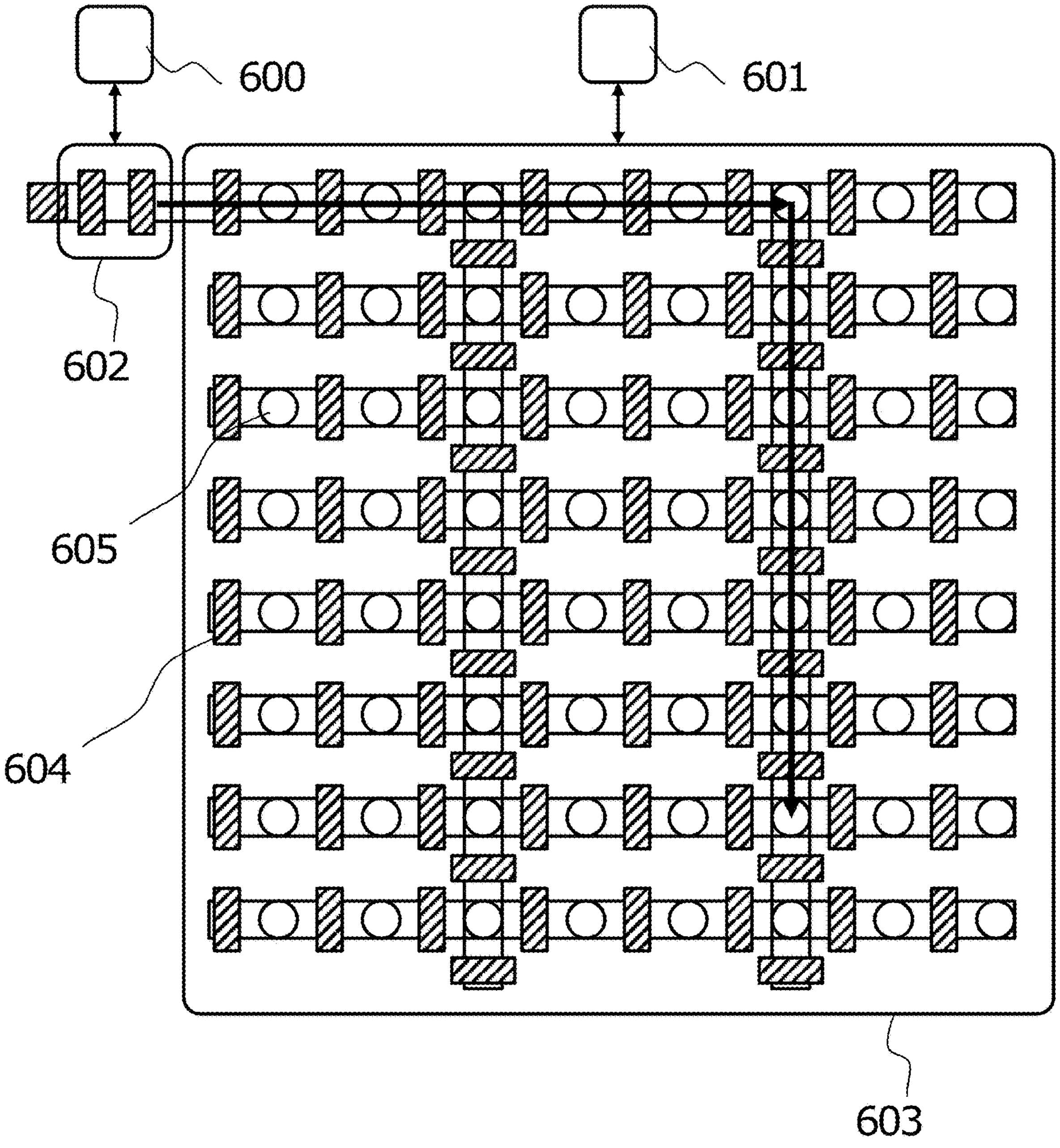
FIG. 6B is a plan view of another two-dimensional large-scale quantum dot array.

FIG. 6B illustrates an example of another configuration. In this configuration, in order to attain a high device manufacturing accuracy, the number of quantum dot connections is reduced. Even in a case where the number of connections is reduced, all the quantum dot portions 605 are connected through other quantum dot portions 605, and thus, the electron obtained by the single-electron pump can be transported to the desired quantum dot.

Figure 6C:
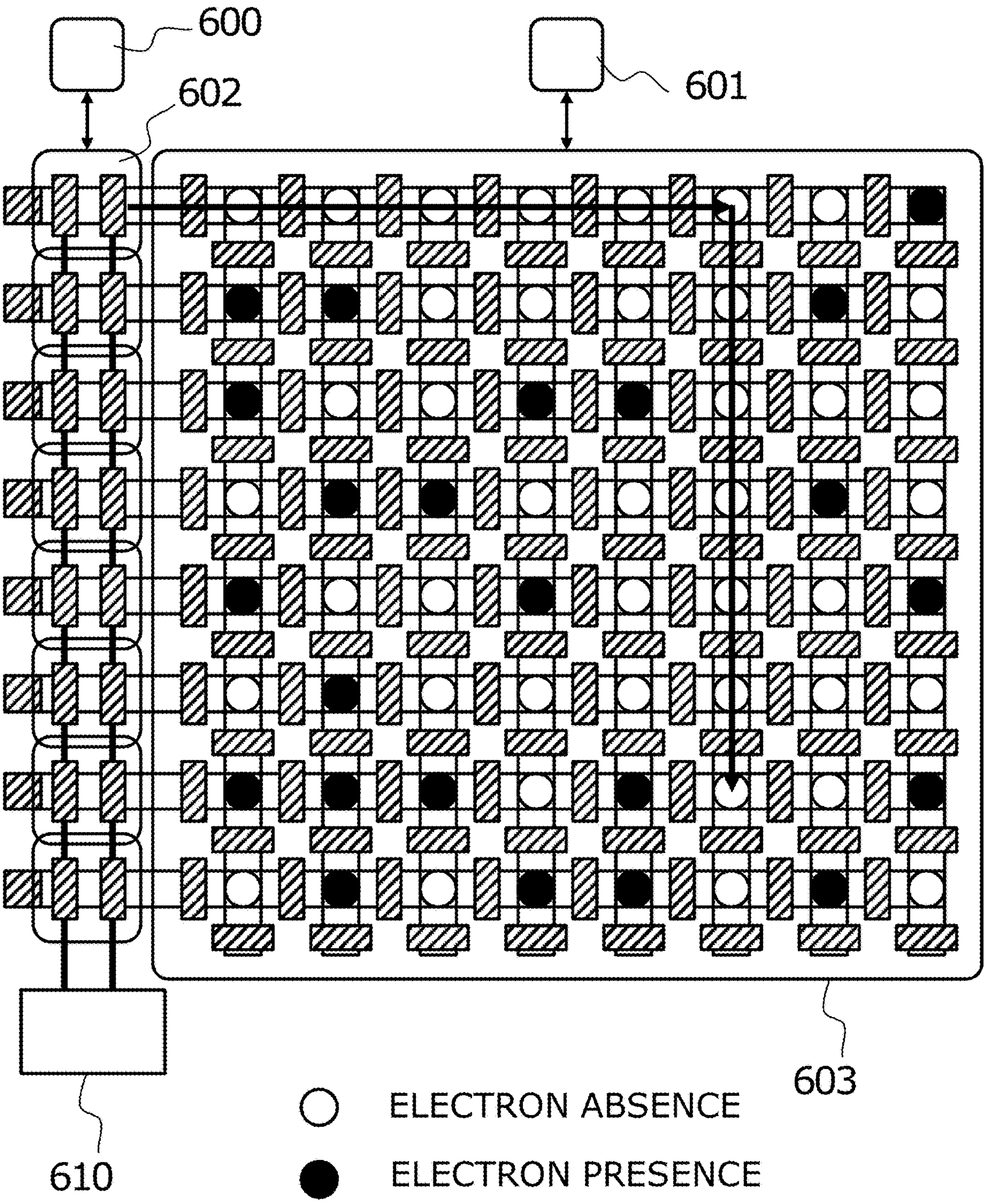
FIG. 6C is a plan view of another two-dimensional large-scale quantum dot array.

FIG. 6C illustrates an example of another configuration. In this configuration, a plurality of single-electron pump portions 602 are arranged in line. Accordingly, it is possible to operate the single-electron pumps in parallel, and it is possible to load the electron at a higher speed. By a parallel control unit 610, it is possible to operate the plurality of single-electron pump portions 602 in parallel. In addition, a black circle portion indicates a region in which the electron is present, and a white circle portion indicates a region in which the electron is absent. As illustrated in the drawing, by providing a portion in which the electron is absent, the degree of freedom of the electron transport can be improved, and for example, a two-quantum bit gate between optional two electrons (quantum bits) can be performed.

[System Chart]

Figure 7:
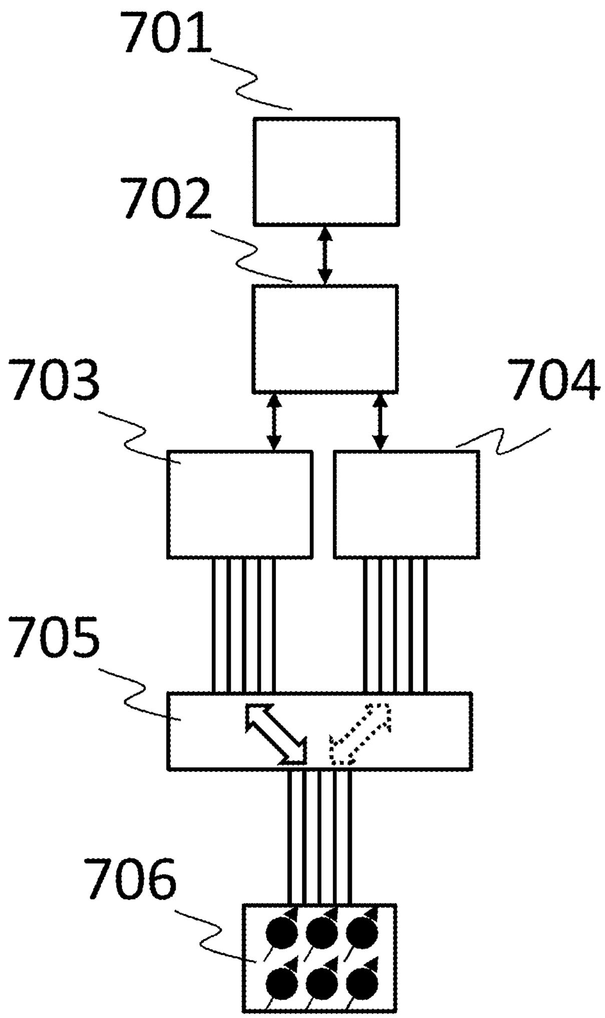
FIG. 7 is a block diagram of a quantum computer system.

FIG. 7 illustrates an example of a system configuration. In a case where a command for the electron loading is issued from a host unit 701, control for the electron loading is started by a controller 702. A voltage control unit includes two modules of a classic voltage control unit 703 and a quantum voltage control unit 704. The classic voltage control unit 703 and the quantum voltage control unit 704 control the voltage that is applied to the gate electrode of the quantum dot array portion 603.

The classic voltage control unit 703 is a voltage control unit for performing the classic confinement and the classic transport described above, in which a voltage control range is approximately several V, which is comparatively large. On the other hand, the quantum voltage control unit 704 is a voltage control unit for performing a quantum manipulation of the spin, and is used for controlling the two-quantum bit gate or the like. Accordingly, the voltage control range is approximately several dozen mV, which is comparatively small.

In the configuration of the voltage control unit in FIG. 7, in the quantum computer of this example, in order to generate the classic potential barrier, for example, a voltage of 0.1 to V can be used as a voltage range, and in order to generate a quantum potential barrier, for example, a voltage of 0.1 to 100 mV can be used as a voltage range.

Such two voltage control units can be switched by a switching unit 705, and for example, the voltage control unit is switched to the classic voltage control unit 703 when loading or reading out the electron, and the voltage control unit is switched to the quantum voltage control unit 704 when performing the quantum manipulation. Accordingly, it is possible to control the electron of a quantum bit array portion 706 at a high speed, a high accuracy, and high stability.

In the system described above, for example, the host unit 701 is a host server (an electronic computer), the controller 702, the classic voltage control unit 703, the quantum voltage control unit 704, and the switching unit 705 are an external circuit of the quantum bit array portion 706, and the quantum bit array portion 706 is arranged in a cooling device. Alternatively, a constituent other than the host unit 701 may be mounted in the cooling device. For example, by setting the controller 702, the classic voltage control unit 703, the quantum voltage control unit 704, and the switching unit 705 to a 4K stage of a dilution refrigerator, and the quantum bit array portion 706 to the lowest temperature position (to mK) of the dilution refrigerator, control with low noise and a high efficiency can be performed.

[Calibration Method for Single-Electron Pump Condition]

Figure 8A:
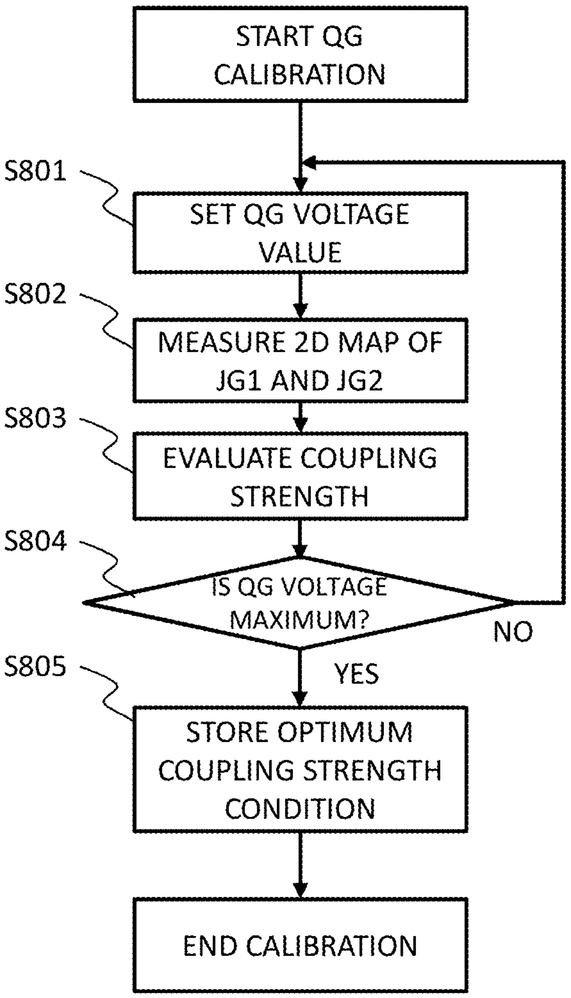
FIG. 8A is a flowchart of calibration of a single-electron pump condition.
Figure 8B:
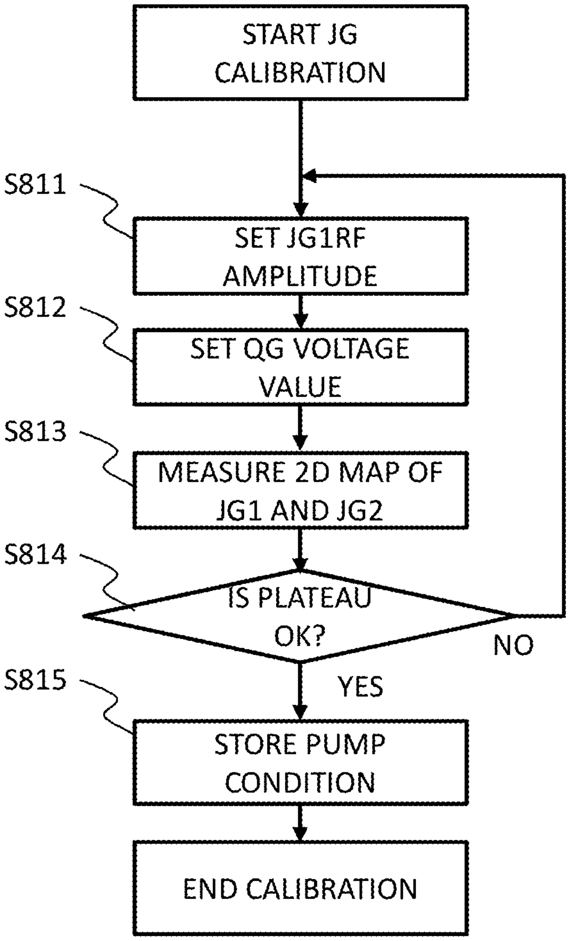
FIG. 8B is a flowchart of the calibration of the single-electron pump condition.

FIG. 8A illustrates a calibration method for the applied voltage of the gate (referred to as QG) directly above the potential 312 of the quantum dot in FIG. 3C, as an example of a calibration method for the single-electron pump condition. In addition, FIG. 8B illustrates a calibration method for the applied voltage of the gate (referred to as JG1 and JG2) directly above the potential barriers 311 and 313 in FIG. 3C. Such calibration is performed by the controller 702 controlling the classic voltage control unit 703, the quantum voltage control unit 704, the switching unit 705, and the quantum bit array portion 706.

In the flow of FIG. 8A, only the DC voltage is applied to each of the gates. While the gate DC voltage of QG is gradually changed to the maximum value (S801 and S804), the DC voltage of JG1 and JG2 is changed to measure a two-dimensional map (S802), and a coupling strength is evaluated (S803). The gate DC voltage of QG to be the optimum coupling strength condition is specified and stores (S805). The details will be described in FIG. 9B.

In FIG. 8B, the calibration method for the applied voltage of JG1 and JG2 is illustrated. First, the AC amplitude applied to JG1 is set. The frequency of AC, for example, is driven at a frequency of 100 MHz, 1 GHz, 10 GHz, or the like (S811). Next, the gate DC voltage of QG is set to a voltage set in the flow of FIG. 8A (S812). In this example, $V_{QG}$ is set to −1.1 V.

In this example, as an example, while an AC amplitude $V_{JG1}^{RF,in}$ applied to a barrier gate JG1 is changed to 0.8 to 1.5 V, a DC voltage $V_{JG1}$ of a barrier gate JG1 is changed in a range of 0 to 2 V, and a DC voltage $V_{JG2}$ of a barrier gate JG2 is changed in a range of 0.5 to 2 V, and thus, the two-dimensional map is measured (S813). In a case where an excellent plateau (a region in which the value is not changed) can be checked on the two-dimensional map (S814), the condition is stored, and the process is ended (S815). The details will be described in FIG. 9C.

[Test Result of Pump Unit]

FIG. 9A to FIG. 10C illustrated an example of a test result of the single-electron pump operation according to the device configuration in FIG. 3B.

Figure 9A:
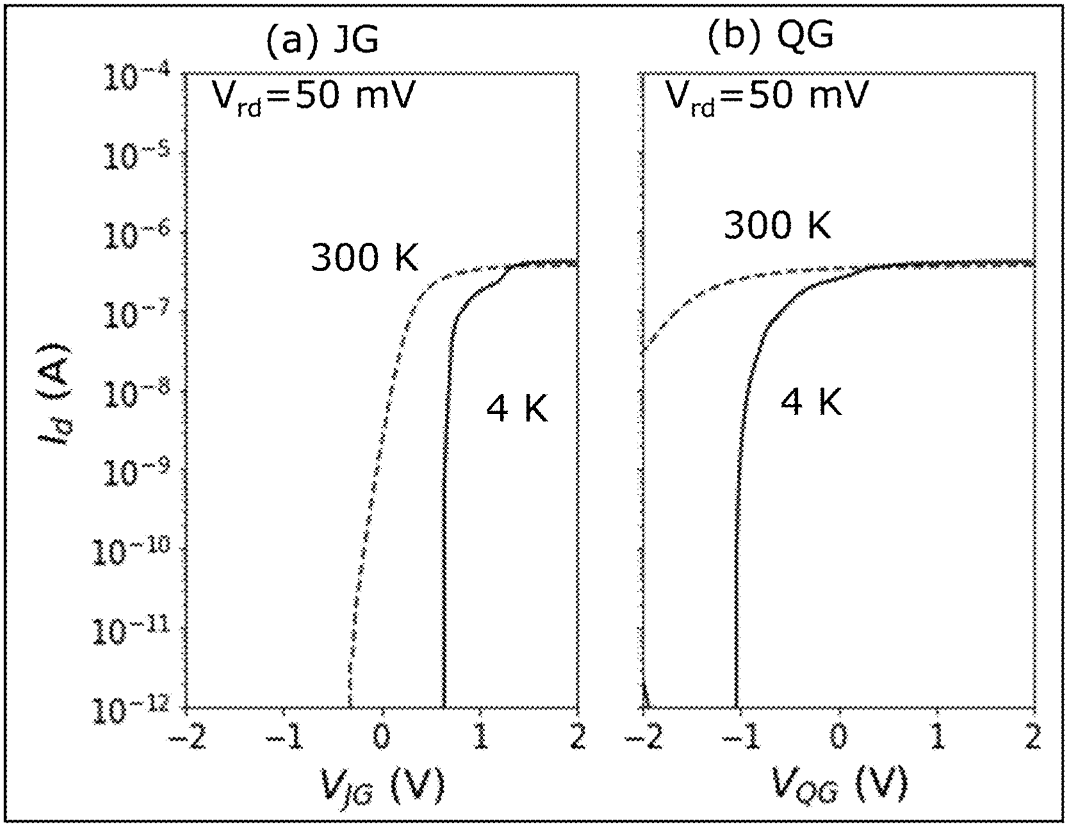
FIG. 9A is a graph chart of a transistor characteristic of a gate for a barrier and the quantum dot.

FIG. 9A illustrates a transistor characteristic when using two types of gates JG (the gate electrode 303 in FIG. 3A) and QG (the gate electrode 304 in FIG. 3A) for the barrier and the quantum dot at an ordinary temperature and an ultralow temperature. A dotted line is the characteristic of the ordinary temperature (300 k), and a solid line is the characteristic of the ultralow temperature (4 k). A drain current $I_d$ when applying the gate voltages $V_{JG}$ and $V_{QG}$ is illustrated. $V_{rd}$ is the voltage between the reservoir and the drain.

Figure 9B:
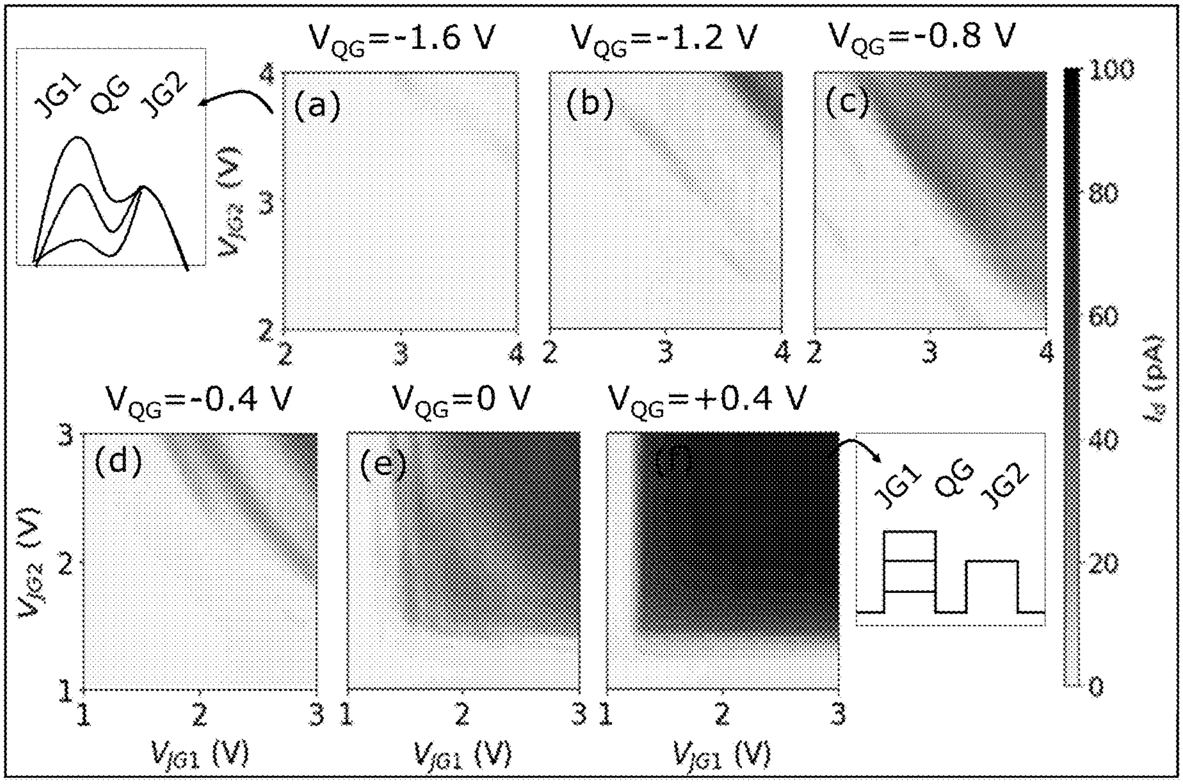
FIG. 9B is an image diagram of a graph for adjusting pump gate coupling.

FIG. 9B is a calibration graph for adjusting pump gate coupling. This corresponds to the two-dimensional map displayed in the map measurement S802 of FIG. 8A. In two-dimensional maps (a) to (f), a horizontal axis is the DC voltage $V_{JG1}$ of the barrier gate JG1, and a vertical axis is the DC voltage $V_{JG2}$ of the barrier gate JG2, in which each of the DC voltages is changed in a range of 2 to 4 V. A source-drain current Id when the DC voltage $V_{QG}$ of QG is changed from −1.6 V to +0.4 V is illustrated. In a dark portion, Id is large.

The two-dimensional map (a) is a case where the pump gate coupling is strong (strong coupling), and as illustrated in a top-left potential coupling diagram (image diagram), $V_{QG}$ varies when $V_{JG1}$ is moved. The two-dimensional map (f) is a case where the pump gate coupling is weak (weak coupling), and as illustrated in a bottom-right potential coupling diagram (image diagram), $V_{QG}$ is not affected by $V_{JG1}$.

Qualitatively, in a case where the pump gate coupling is strong, the power of the single-electron pump for extracting the electron from the reservoir is strong. On the other hand, in a case where the pump gate coupling is strong, a high voltage is required for the barrier gate in order to move the electron. In such an example, in the two-dimensional maps (a) and (b), the pump gate coupling is strong, but in a case where a high voltage is not applied, the current does not flow. In the two-dimensional map (c), the coupling is weak, but the current flows even at a low voltage. In the coupling strength evaluation (S803) of this example, the condition of the single-electron pump having an excellent characteristic for transporting a single electron is set between the conditions of the two-dimensional maps (c) and (b). In the condition of this example, $V_{QG}$ is set to −1.1 V. The coupling strength evaluation may be automatically performed by setting an evaluation condition of the two-dimensional map in advance, or an operator may visually select the two-dimensional map.

Figure 9C:
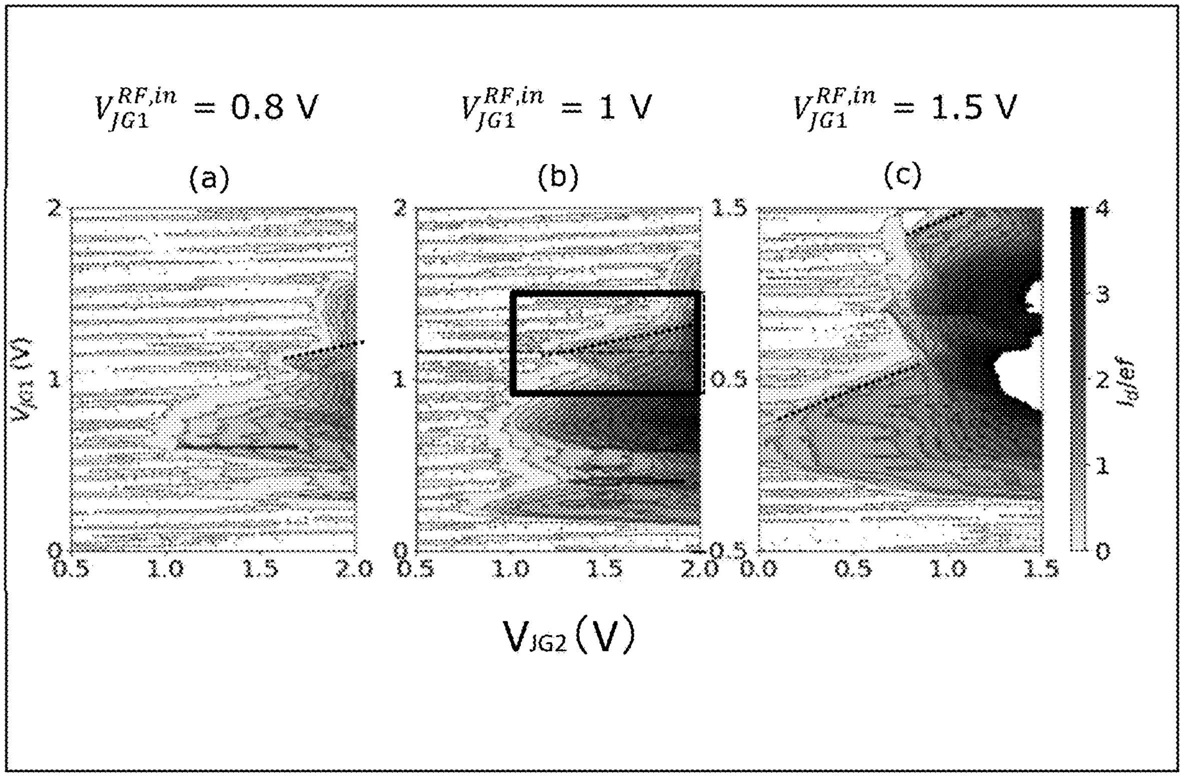
FIG. 9C is an image diagram of a graph for searching for the single-electron pump condition.

FIG. 9C is a graph for searching for the single-electron pump condition, and corresponds to the two-dimensional map (S813) in FIG. 8B. In the two-dimensional map, a horizontal axis is the DC voltage $V_{JG2}$ of the barrier gate JG2, and a vertical axis is the DC voltage $V_{JG1}$ of the barrier gate JG1, in which the DC voltages are changed in the condition illustrated in FIG. 8B. The AC voltage is superimposed only on the barrier gate JG1.

Each of (a) to (c) in FIG. 9C illustrates an $I_d$/ef value in a case where the AC amplitude $V_{JG1}^{RF,in}$ of the barrier gate JG1 is changed to 0.8 V, 1 V, and 1.5 V, in which a dark portion indicates a large $I_d$/ef value. Note that, $I_d$ is the drain current, e is a unit charge (an elementary charge), and f is an operation frequency of the single-electron pump (= the AC frequency of the barrier gate JG1).

As can be seen from (a) to (c) in FIG. 9C, the electron pump extracts more currents as the AC amplitude of the barrier gate JG1 increases, but in this example, it is necessary to attain a single-electron pump extracting a single charge. In (b) of FIG. 9C, by operating the single-electron pump in a range surrounded by a thick-line rectangle, it is possible to load a single electron by a classic manipulation. The reason will be described below.

Figure 10A:
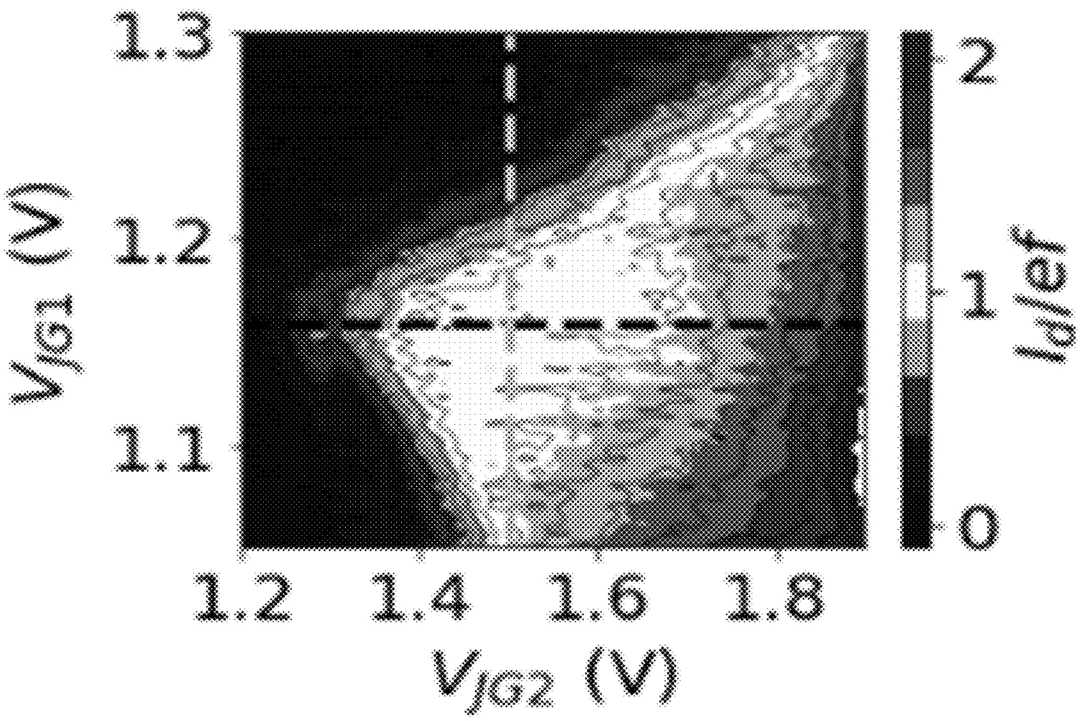
FIG. 10A is a graph chart of a result of attaining the single-electron pump operation.

FIG. 10A is a diagram in which the periphery of the range surrounded by the thick-line rectangle in (b) of FIG. 9C is enlarged. FIG. 10A illustrates a relationship between $V_{JG1}$, $V_{JG2}$, and $I_d$/ef, in which a light white portion is a region of $I_d$/ef=1, that is, $I_d$=ef. In such a region, the flowing current Id indicates that the unit charge e is transported at the frequency f, that is, the unit charge is transported by the single-electron pump. It can be seen that $V_{JG1}$ is approximately 1.16 V, and $V_{JG2}$ is approximately 1.5 V, in which the region of $I_d$=ef is obtained in a wide range.

Figure 10B:
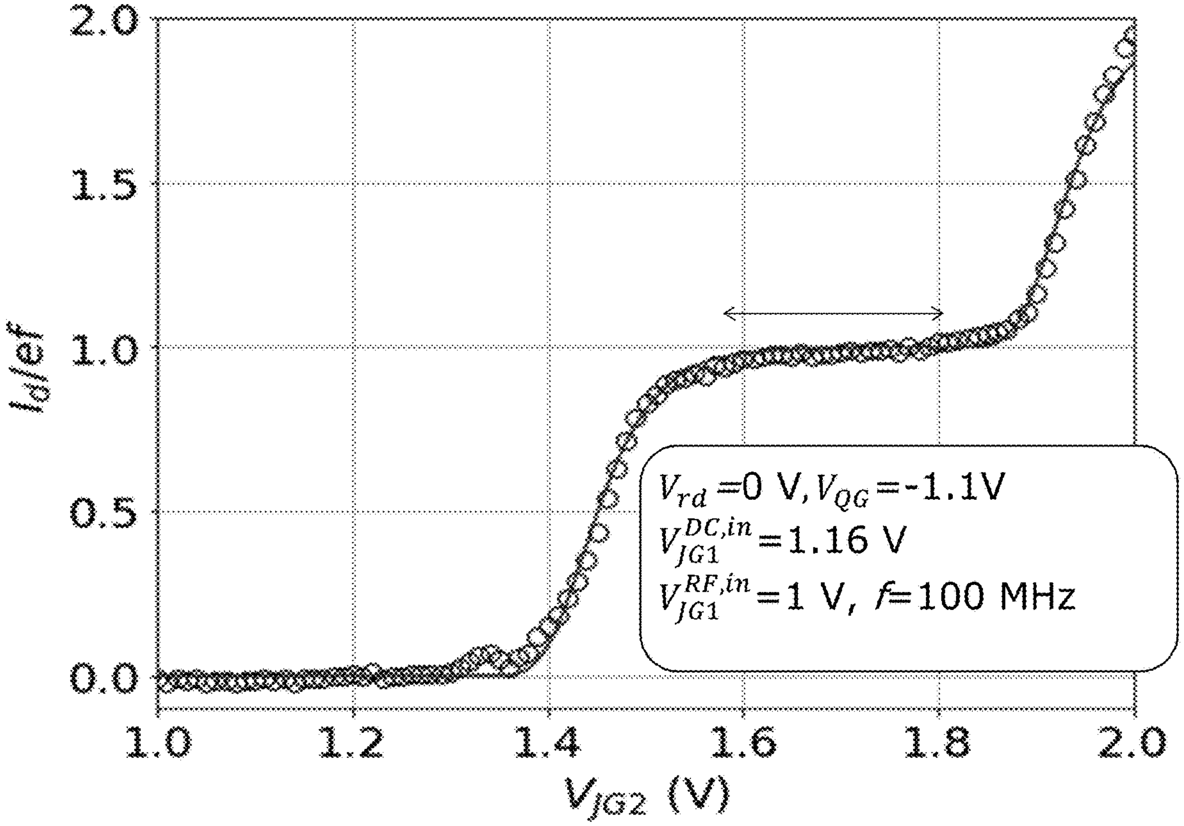
FIG. 10B is a graph chart of the result of attaining the single-electron pump operation.

FIG. 10B is a graph of the result of attaining the single-electron pump operation, and illustrates a relationship between $V_{JG2}$ and $I_d$/ef. An open circle is a test value, and a solid line is a fitting value. The reservoir-drain voltage $V_{rd}$ is 0 V. According to the calibration result illustrated in FIG. 8B and FIG. 9B, $V_{QG}$ is set to −1.1 V. As illustrated in FIG. 10A, $V_{JG1}$ is 1.16 V. According to the condition of (b) in FIG. 9C, the AC voltage amplitude $V_{JG1}^{RF,in}$ of the barrier gate JG1 is 1 V. The AC frequency f of the barrier gate JG1 is optional, and is 100 MHz. As illustrated in the graph of FIG. 10B, it is found that $I_d$/ef is 1 in a range where $V_{JG2}$ is approximately 1.6 to 1.8 V, and the single-electron pump is attained.

Figure 10C:
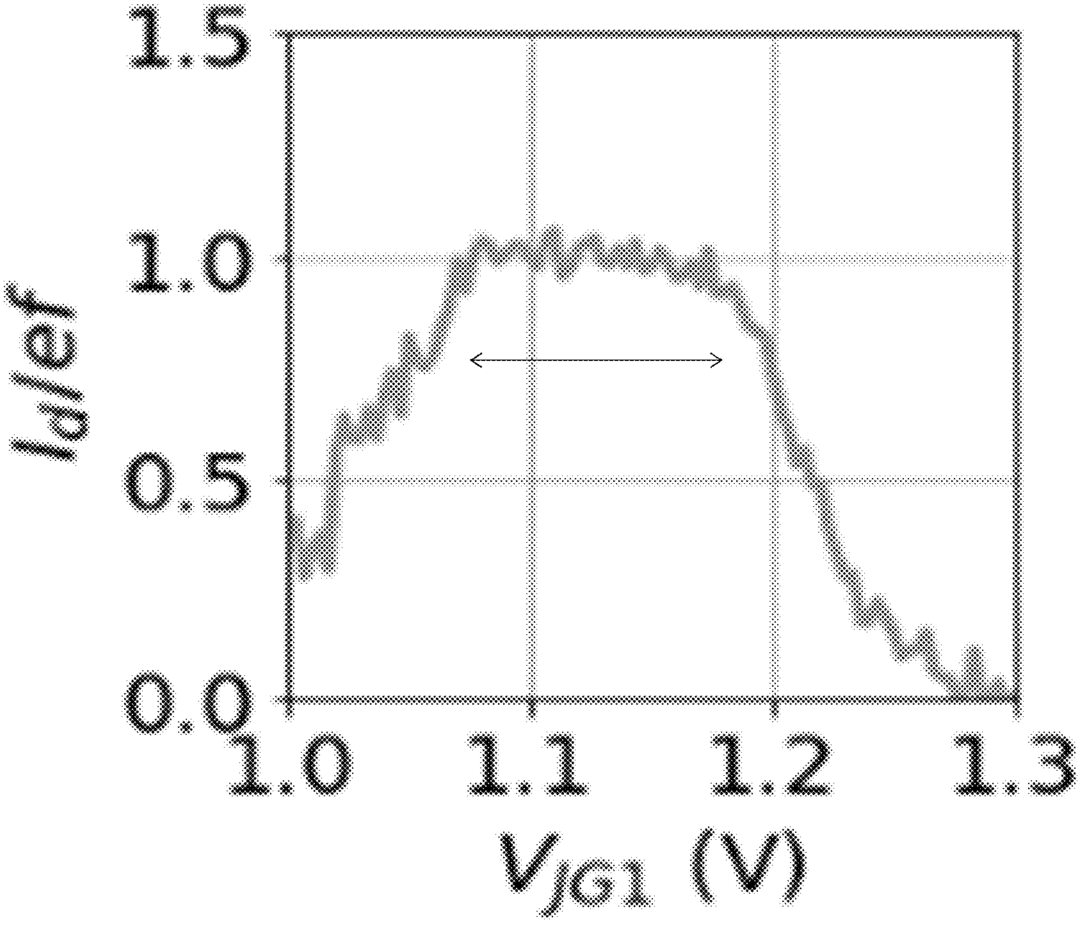
FIG. 10C is a graph chart of the result of attaining the single-electron pump operation.

FIG. 10C illustrates a relationship between $V_{JG1}$ and $I_d$/ef when $V_{JG2}$ is 1.5 V. As illustrated in the graph of FIG. 10C, it is found that $I_d$/ef is 1 in a range where $V_{JG1}$ is approximately 1.08 to 1.18 V, and the single-electron pump is attained.

According to FIG. 10A to FIG. 10C, the plateau (Giblin, Stephen P., et al. "Evidence for universality of tunable-barrier electron pumps." Metrologia 56.4 (2019): 044004) that is the feature of the single-electron pump operation is clearly seen, and thus, it is possible to check that the single-electron pump operation is correctly performed.

Example 2

In the Example 1, an example has been described in which the electron loading of transporting and confining the electrons one by one to each of the quantum dots is executed by the classic manipulation. In the classic manipulation, in general, the polarization and the phase of the spin are not conserved, which is not problematic in the loading or the initialization before a quantum operation. In the quantum computer, a quantum gate operation (a quantum calculation manipulation) is performed by aligning the spin polarization after the electron is loaded, and then, the electrons are transported and read out one by one.

When reading out the electron as described above, the electron is transported as illustrated in FIG. 4A to FIG. 5. In the readout of the electron, it is irrelevant to the spin phase, but it is necessary for the spin polarization to have the state of the quantum operation is conserved. In the classic manipulation, as described below, it is possible to move the electron by conserving a spin up/down probability when reading out the electron.

When reading out the state of the electron spin, in general, Z-axis measurement (the measurement of the spin up/down probability) is performed. Accordingly, the phase of the electron before readout does not affect a measurement result. Accordingly, by classically moving the electron to a readout position such that only the spin up/down probability is conserved, after the quantum calculation manipulation is ended, it is possible to effectively extend a coherence time until the measurement from phase relaxation T2 to an energy relaxation time T1, and it is possible to lengthen an effective coherence time. By adjusting a change rate of the potential when a gradient is set in the classic potential barrier in order to transport the electron, it is possible to attain electron movement in which the spin up/down probability is conserved. Specifically, the change rate of the potential indicated by the arrow in FIG. 4A to FIG. 5 is slowed. A transport rate of the electron is slowed, but the spin up/down probability is conserved, and thus, the readout after the operation can be performed without any difficulty.

As described above, in the quantum computer of this example, the transport rate of the electron for the readout after the quantum operation is slower than the transport rate of the electron for the loading before the quantum operation, and thus, it is possible to read out the electron by conserving the spin up/down probability.

Example 3

Figure 11:
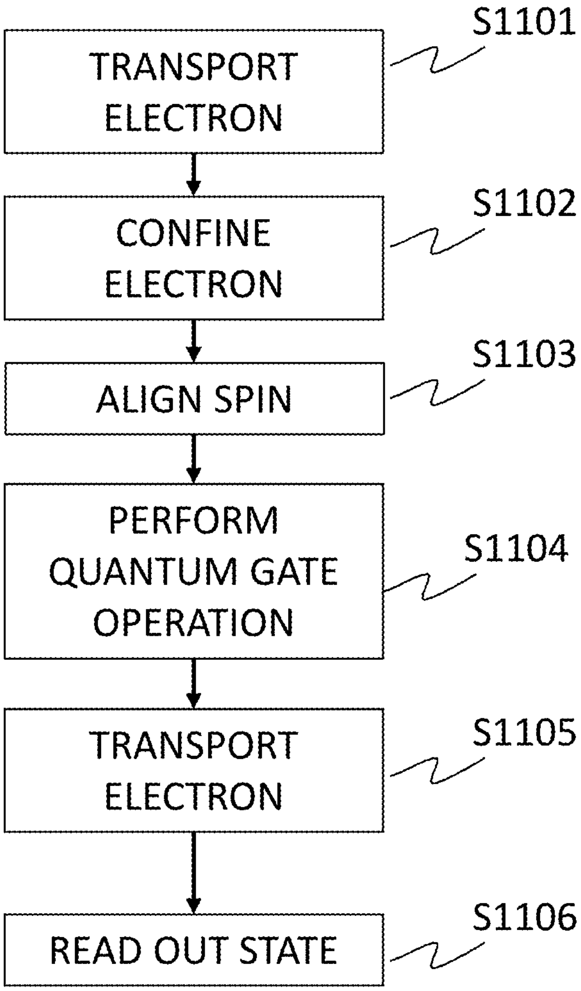
FIG. 11 is a flowchart of calculation processing of a quantum computer of an example.

FIG. 11 is a schematic flowchart of calculation processing of the quantum computer of the example. Such processing can be attained by the host unit 701 instructing the controller 702 in FIG. 7, and by the classic voltage control unit 703 and the quantum voltage control unit 704 controlling the voltage applied to the gate electrode of the quantum dot array portion 603 under the control of the controller 702.

First, the electron, for example, is transported to a desired quantum bit position in FIG. 6A (S1101), and is confined as the quantum bit (S1102). In such a step, the quantum operation is not operated, and thus, it is irrelevant to the state of the electron spin, and as described in the Example 1, the step is executed by the single-electron pump and the classic potential barrier generated by the classic voltage control unit 703.

Next, as known, the initialization is performed by aligning the state of the spin (S1103), and the required quantum gate operation is performed (S1104). In this case, it is necessary to conserve an operation result, and thus, it is necessary to conserve the polarization or the phase of the electron spin, and the movement of the electron is executed by the quantum potential barrier generated by the quantum voltage control unit 704.

Next, in a step of reading out the operation result, the electron is transported to the readout position (S1105), and the state is read out (S1106). In this case, it is necessary to conserve information of the polarization of the electron for readout. Accordingly, the quantum potential barrier may be used, but has problems in a high speed or the stability as described above in the SUMMARY OF THE INVENTION. Here, as described in the Example 2, the classic voltage control unit 703 sets a change rate of a classic potential when moving the electron slower than, for example, that in step S1101, and thus, the electron can be transported without changing the polarization of the electron.

[Feature of Proposed Method (Compatibility and Switch Between Classic Method and Quantum Method)]

In the operation of the quantum computer of the quantum dot array includes a "quantum operation" including a spin manipulation and "electron loading" not including the spin manipulation. Among them, at least for the "electron loading" not including the spin manipulation, it is possible to manipulate the electron at a high speed, a high accuracy, and high stability by the classic transport and the classic confinement.

In Giblin, Stephen P., et al. "Evidence for universality of tunable-barrier electron pumps." Metrologia 56.4 (2019): 044004, for example, the single-electron pump operation at the transport rate in the order of GHz and the error rate in the order of ppm is reported. Accordingly, by loading the electron using the single-electron pump, the transport rate in the order of GHz and the error rate in the order of ppm can be attained, and the quantum computer with high scalability using the large-scale quantum dot array can be attained.

As described above, in the quantum computer of the quantum dot array using an electron spin in silicon, it is necessary to confine the electrons one by one to each of the quantum dots when initializing quantum calculation. By using the reservoir and the single-electron pump of an AC drivable gate electrode, it is possible to transport and confine a single electron at a high speed, a high accuracy, and high stability.

According to the method of this example, in the quantum computer of the large-scale quantum dot array, it is possible to transport and confine the electron at a high speed, a high accuracy, and high stability. According to the example described above, the quantum computer with a high energy efficiency can be attained, and thus, consumption energy is low, carbon emission amount is reduced, and global warming is prevented, which is capable of contributing to the attainment of the sustainable society.

What is claimed is:

1. A quantum computer of a semiconductor, the computer comprising:

a semiconductor crystalline substrate;

a gate electrode array structure formed on a surface of the semiconductor crystalline substrate; and a reservoir unit that is a carrier supply unit, wherein a classic potential barrier is formed in the semiconductor crystalline substrate by controlling an applied voltage to the gate electrode array structure, wherein a charge supplied from the reservoir unit is transported into the classic potential barrier, wherein a classic voltage control unit generates the classic potential barrier, wherein a quantum voltage control unit generates a quantum potential barrier having a different gate voltage range than for generating the classic potential barrier, and wherein a switching unit switches the classic voltage unit and the quantum voltage control unit.

2. The quantum computer according to claim 1, wherein a voltage of 0.1 to 10 V is used as the voltage range for generating the classic potential barrier, and a voltage of 0.1 to 100 mV is used as the voltage range for generating the quantum potential barrier.

3. The quantum computer according to claim 1, wherein the gate electrode array structure includes a single-electron pump for ejecting a unit charge from the reservoir unit.

4. The quantum computer according to claim 3, wherein the single-electron pump includes a first gate controlling a first classic potential barrier, a second gate controlling a second classic potential barrier, and a third gate controlling a third classic potential barrier, in order of proximity to the reservoir unit, and applies an AC voltage to the first gate.

5. The quantum computer according to claim 4, wherein in order to transport the unit charge ejected by the single-electron pump, a gradient is set in the classic potential barrier formed in the semiconductor crystalline substrate.

6. The quantum computer according to claim 5, wherein a change rate of a potential when setting the gradient in the classic potential barrier is set slower when transporting the unit charge after a quantum operation with respect to a quantum bit by the unit charge than when transporting the unit charge before the quantum operation with respect to the quantum bit by the unit charge.

7. The quantum computer according to claim 6, wherein when transporting the unit charge after the quantum operation with respect to the quantum bit, the change rate of the potential when setting the gradient in the classic potential barrier is set such that polarization of a spin of the unit charge is conserved.

8. The quantum computer according to claim 7, wherein when transporting the unit charge during the quantum operation with respect to the quantum bit, the quantum potential barrier is used such that the polarization and a phase of the spin of the unit charge are conserved.

9. The quantum computer according to claim 8, wherein when transporting the unit charge before the quantum operation with respect to the quantum bit, the change rate of the potential when setting the gradient in the classic potential barrier is set regardless of the conservation of the polarization and the phase of the spin of the unit charge.

10. The quantum computer according to claim 4, wherein a DC voltage applied to each of the first gate, the second gate, and the third gate, and the AC voltage applied to the first gate are calibrated.

11. A control method for a quantum computer including a semiconductor, the method executing:

ejecting a unit charge by using a classic potential barrier from a reservoir unit that is a carrier supply unit;

sending the ejected unit charge to a desired quantum bit position by using a gradient of the classic potential barrier;

performing a quantum bit operation with respect to the unit charge sent to the desired quantum bit position;

generating, by a classic voltage control unit, the classic potential barrier;

generating, by a quantum voltage control unit, a quantum potential barrier having a different gate voltage range than for generating the classic potential barrier; and switching, by a switching unit, the classic voltage unit and the quantum voltage control unit.

12. The control method for a quantum computer according to claim 11, wherein, when the unit charge is moved while the quantum bit operation is executed, the movement is performed by a manipulation of a quantum potential barrier.

13. The control method for a quantum computer according to claim 11, further comprising:

performing a movement of the unit charge when the unit charge is moved in order to read out a quantum bit after the quantum bit operation is ended, by a manipulation of the classic potential barrier, wherein a manipulation speed of the classic potential barrier in the performing of the movement of the unit charge when the unit charge is moved in order to read out the quantum bit after the quantum bit operation is ended is set slower than a manipulation speed of the classic potential barrier in the sending of the ejected unit charge to the desired quantum bit position by using the gradient of the classic potential barrier.

* * * * *